United States Patent
Boudin

(10) Patent No.: US 9,995,579 B2
(45) Date of Patent: Jun. 12, 2018

(54) LONG BASE INCLINOMETER WITH OPTICAL MEASUREMENT

(71) Applicants: CENTRE NATIONAL DE LA RECHERCHE SCIENTIFIQUE, Paris (FR); UNIVERSITE DE MONTPELLIER, Montpellier (FR)

(72) Inventor: Frederick Boudin, Montpellier (FR)

(73) Assignees: CENTRE NATIONAL DE LA RECHERCHE SCIENTIFIC, Paris (FR); UNIVERSITE DE MONTPELLIER, Montpellier (FR)

( * ) Notice: Subject to any disclaimer, the term of this patent is extended or adjusted under 35 U.S.C. 154(b) by 0 days. days.

(21) Appl. No.: 14/647,791

(22) PCT Filed: Dec. 2, 2013

(86) PCT No.: PCT/EP2013/075284
§ 371 (c)(1),
(2) Date: May 27, 2015

(87) PCT Pub. No.: WO2014/083207
PCT Pub. Date: Jun. 5, 2014

(65) Prior Publication Data
US 2015/0316373 A1 Nov. 5, 2015

(30) Foreign Application Priority Data
Nov. 30, 2012 (FR) ...................................... 12 61528

(51) Int. Cl.
*G01C 9/06* (2006.01)
*G01B 11/26* (2006.01)
(Continued)

(52) U.S. Cl.
CPC ................ *G01C 9/06* (2013.01); *G01B 11/26* (2013.01); *G01C 5/04* (2013.01); *G01C 9/22* (2013.01); *G01C 2009/066* (2013.01)

(58) Field of Classification Search
CPC ...................................................... G01C 9/06
(Continued)

(56) References Cited

U.S. PATENT DOCUMENTS 3,511,572 A * 5/1970 Fortier ................ G01F 23/0007
356/496
4,244,223 A * 1/1981 Geiger ..................... G01V 7/00
73/170.16
(Continued)

FOREIGN PATENT DOCUMENTS

| FR | 1 056 230 A | 2/1954 |
|---|---|---|
| WO | 81/00150 A1 | 1/1981 |
| WO | 2012/013698 A1 | 2/2012 |

OTHER PUBLICATIONS

Chery et al., "High Resolution tiltmeters and seismometers based on Extrinsic Fiber Fabbry-Perot Interferometry (EFFPI) the LINES project—ANR funding 2009-2012," LSBB, May 29, 2012, pp. 1-26.
(Continued)

*Primary Examiner* — Tarifur Chowdhury
*Assistant Examiner* — Omar Nixon
(74) *Attorney, Agent, or Firm* — Im IP Law; C. Andrew Im

(57) ABSTRACT

A tiltmeter to measure a variation in inclination of a structure from a given starting position. The tiltmeter has two pots, each pot contains an identical volume and identical height of an identical liquid. A communication device connects the two pots and allows the liquid to flow between the two pots by the principle of communicating vessels. Two optical measuring devices are provided, one optical measuring device per pot. Each optical measuring device measures a variation in height of the level of liquid in the associated pot. The optical measuring devices are fiber optic devices coupled to a common light source.

11 Claims, 6 Drawing Sheets

(51) Int. Cl.
*G01C 5/04* (2006.01)
*G01C 9/22* (2006.01)

(58) Field of Classification Search
USPC .......................................................... 356/482
See application file for complete search history.

(56) References Cited

U.S. PATENT DOCUMENTS

| | | | |
|---|---|---|---|
| 5,148,018 A | 9/1992 | Ammann | |
| 6,119,535 A * | 9/2000 | Tambo | G01F 23/243 73/865.8 |
| 2006/0139626 A1* | 6/2006 | Childers | G01C 9/06 356/138 |

OTHER PUBLICATIONS

Kostoglodov et al., "Long-baseline fluid tiltmeter for seismotectonic studies of Mexican subduction zone," Geofisica Int., Jan.-Mar. 2002, pp. 11-25, vol. 41, No. 1.
Boudin et al., "A silica long base tiltmeter with high stability and resolution," Rev. Sc. Instrum., 2008, pp. 034502:1-034502:11, American Institute of Physics, vol. 79.
D'Oreye et al., "Very high resolution long-baseline water-tube tiltmeter to record small signals from Earth free oscillations up to secular tilts," Rev. Sci. Instrum., 2005, pp. 024501:1-024501:12, American Institute of Physics, vol. 76.

\* cited by examiner

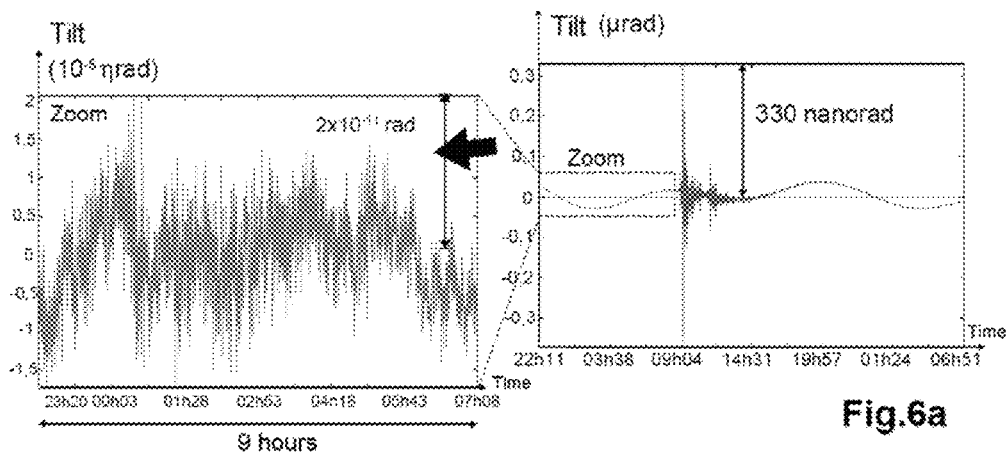
Fig.6a
Fig.6b
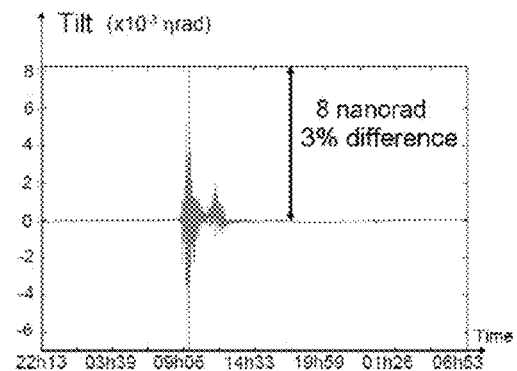
Fig.6c

LONG BASE INCLINOMETER WITH OPTICAL MEASUREMENT

RELATED APPLICATIONS

This application is a § 371 application from PCT/EP2013/075284 filed Dec. 2, 2013, which claims priority from French Patent Application No. 12 61528 filed Nov. 30, 2012, each of which is herein incorporated by reference in its entirety.

FIELD OF THE INVENTION

The present invention concerns a tiltmeter, that is to say a device intended to measure tilt variations of structures. The invention is notably usable in horizontal bores or galleries, in the field of civil engineering, for the surveillance of structures and buildings, and generally wherever precise monitoring of the stability of a structure is required, in particular in the long term.

BACKGROUND OF THE INVENTION

Tilt variations of structures are measured frequently and notably in the case of measurement of geophysical deformations, more specifically seismic or volcanic deformations. Such measurements are also carried out to warn of the possible danger of collapse of buildings or a portion thereof or to monitor changes in the storage of fluids in geological storage sites and the migration of these fluids into the permeable layer. These measurements can also be used to monitor the horizontally of large industrial structures.

During an earthquake, in fault areas, the movement of geological faults occurs rapidly. Detection of these movements is easy. Between two earthquakes deformations exist but are very small and very slow. Now these deformations are linked to seismic activity and detection of these deformations is essential for understanding the mechanism of faults in the earth's crust. It is therefore necessary to use measuring instruments that are very stable and reliable in the long term, from several years to several centuries.

At present there are no commercially available devices that can be installed in an array and are capable of producing a high-resolution measurement that is stable in the long term. The devices known at present are generally bubble tiltmeters, pendulum tiltmeters. Such devices can be installed in bores and in arrays but prove unstable in the long term. Other known devices include hydrostatic tiltmeters associated with capacitive, magnetic or linear variable differential transformer (LVDT) induced current sensor type measuring systems. The latter can prove stable in the long term but have the disadvantage that they cannot be installed in bores and therefore in an array. Moreover, all of these devices use electronic components that are too close to the sensor, significantly reducing the long-term reliability of the device. All these devices enable quantification of the deformations based on the measured tilt variations.

SUMMARY OF THE INVENTION

The present invention proposes a new device enabling precise measurement of tilt variations of a structure.

One objective of the present invention is to provide a device suitable for measuring tilt variations over time addressing constraints of size, performance and cost that make its use in an industrial environment realistic.

These objectives, along with others that will become apparent hereinafter, are achieved in accordance with the invention by a tiltmeter for measuring a tilt variation of a structure from a given starting position, including:
 two pots, each pot containing an identical volume and an identical height of an identical liquid,
 communication means connecting said two pots and allowing the liquid to flow between the two pots in accordance with the principle of communicating vessels,
 two optical measuring devices, one optical measuring device per pot.

Each optical measuring device measuring a liquid level height variation $\Delta z$ in the associated pot.

The tiltmeter is based on measuring a liquid level height variation $\Delta z$ in the pots.

By "height" or "altitude" is meant a vertical direction, that is to say a direction substantially parallel to the force of gravity. Similarly, by "horizontally" is meant the direction substantially perpendicular to the force of gravity.

When the structure undergoes deformation, this leads to a tilt variation relative to the initial position of the structure to which it is rigidly fastened. The relative movement between the structure in the initial position and the liquid level height variation in the pots advantageously makes it possible to measure the tilt variation of the structure.

The height movement of the liquid level in a pot relative to the structure is measured by an optical measurement of movement of this height acquired by an optical measuring device.

Optical measurements are contactless measurements and have the advantage of avoiding the problems of capillarity that may be observed with LVDT sensor type induced current measuring systems.

Moreover, optical measurements advantageously make it possible to increase the measurement dynamic of the tiltmeter, that is to say the maximum height variation of the liquid level in a pot.

This measurement dynamic, at least of the order of one centimeter, makes it possible to facilitate placing the tiltmeter in any installation, such as a bore, for example, and consequently to reduce the installation time.

The tiltmeter is advantageously intended for measuring geophysical deformations of geological storage reservoirs and for applications in civil engineering (deformation of civil engineering structures) where precise monitoring of the stability of a structure is required, especially in the long term.

In accordance with preferred embodiments, the invention further has the following features, implemented separately or in each of their technically operative combinations.

In preferred embodiments of the invention, in order to minimize the drift of the measuring system, the optical measuring devices are fiber optic devices coupled to a common light source.

The use of optical fibers advantageously makes it possible to site remotely the active optical components, such as the light sources, the detection means, in a protected space that is not subjected to the stresses of the external environment, such as radiation, electromagnetism, oxidation, etc. This increases the long-term reliability of the measuring system and that of the tiltmeter.

Also the mechanical portion of the tiltmeter, such as the pots, the communication means, and the passive optical components, such as the optical fibers may be installed in an environment subject to stresses, such as an environment exposed to radiation, electromagnetism, oxidation or heat, for example. The overall size of the pots, the communication means and the passive optical components is significantly reduced, by an amount of the order of a few centimeters; this shows an undoubted advantage for use in an industrial environment where the volumes usable are often extremely small or even difficult to access.

Optical fibers are also insensitive to electromagnetic influences.

The tiltmeter of the invention is completely different from existing tiltmeters, whether optical, electrical or capacitive. For all existing tiltmeters there are found at the level of the pots electrical power supplies, optical components, electronics, etc., all of which are highly sensitive to electromagnetic variations, radiation or oxidation. There may be cited by way of example the light sources (laser or otherwise) associated with each pot, electronic components associated with each light source necessary for each of said light sources to function, charge-coupled device (CCD) video cameras or photodiodes for converting a light signal into an electrical signal, deflecting mirrors positioned above the pots to reflect the optical beams toward the video cameras or photodiodes. All these components are bulky and difficult to control in a hostile environment (radiation, oxidation and electromagnetism).

Coupling the optical measuring devices to a single common light source advantageously makes it possible to eliminate all common mode noise. Coupling the optical measuring devices to a single common light source advantageously makes it possible to eliminate the wavelength drift inherent to each light source as well as noise or thermal, atmospheric, electromagnetic errors produced by the environment.

Moreover, in contrast to existing long baseline tiltmeters necessitating a plurality of light sources and optical and mechanical components at the level of each pot, thereby increasing the overall cost of said tiltmeters, the tiltmeter in accordance with the invention with a single remotely sited light source has a significantly reduced manufacturing cost.

Monitoring drift by a duplicated measurement and using a common light source also has an economic advantage. This makes it possible to use a stable light source costing at least 10 to 100 times less than light sources that are ultra stable in the long term and age faster.

Moreover, the use of optical fibers facilitates maintenance of the tiltmeter in the long term. The active components being sited remotely in an accessible area, if one of these components fails, this facilitates the replacement of that component; it is no longer necessary to be able to access the pots, especially when the latter are situated in an environment to which access is difficult. In existing tiltmeters, the large number of optical, mechanical and electronic components at the level of the pot increases the risk of breakdown and commensurately reduces long-term reliability. This is a priori virtually impossible to envisage in a hostile environment exposed to radiation necessitating very costly intervention. And it is impossible in a bore without removing the tiltmeter from the bore. The reference is then lost and the very fine long term measurement is lost.

The use of a tiltmeter with a long baseline (30 meters and more) also has a very important advantage in relation to long term stability of coupling. The larger the tiltmeter, the higher the signal-to-noise ratio, even at very low frequencies, for observing deformations that can last several days to several years. Studies undertaken to observe the deformations produced by geological storage reservoirs, or storage of radioactive materials or geological faults show that it is necessary to achieve stabilities better than $10^{-8}$ rad/month, which the tiltmeter of the invention can achieve. (See the following publications:

Kostoglodov et al, 2002. "Long-baseline fluid tiltmeter for seismotectonic studies of Mexican subduction zone", *Geofisica Int.*, 41(1), 11-25, Boudin et al, 2008, "A silica long base tiltmeter with high stability and resolution", *Rev. Sci. Instrum.*, 79, 034502, doi:10.1063/1.2829989, D'Oreye, N. & Zurn, W., 2005. "Very high resolution long-baseline watertube tiltmeter to record small signals from Earth free oscillations up to secular tilts", *Rev. Sci. Instrum.*, 76, 024501, doi:10.1063/1.1844451.)

In preferred embodiments of the invention, the fiber optic devices are extrinsic fiber optic devices, and each optical measuring device comprises:

a light source, of central wavelength $\lambda_0$, for generating a light beam in the direction of the associated pot, a reflecting surface positioned inside the pot, an optical fiber, called the measuring fiber, for transporting and guiding the light beam toward the associated pot, one end of said measuring fiber, fixed at the level of a high end of the pot and disposed facing the reflecting surface, forming with said reflecting surface an external Fabry-Pérot optical cavity, means for detecting an interferometric signal, said interferometric signal containing information on the movement of the liquid level relative to the end of the measuring fiber, and being generated by interference between a reference light beam and a measurement light beam, said reference light beam corresponding to a fraction of the light beam from the light source that is reflected by the end of the fiber and said measurement light beam corresponding to a fraction of the light beam from the light source that is reflected by the reflecting surface and that follows an optical path in the Fabry-Pérot cavity the variation of which is a function of the height variation of the liquid level in the pot to be determined.

The light source being common to the two optical measuring devices, the tiltmeter includes a 1*2 channel coupler for splitting the beam from the common light source into two beams.

The beam from the common light source propagates via a fiber toward the coupler and then toward a measuring fiber and an external Fabry-Pérot optical cavity.

In such extrinsic fiber optic devices, the optical fiber used is not the transducer and serves only as the medium for the transmission of a light beam from one point to another. The optical fiber is a passive component, the external environment, such as moisture, temperature, etc., does not interfere with the measurements. This type of extrinsic fiber optic device therefore makes it possible to site remotely outside the measuring area all of the opto-electronic components.

Such extrinsic fiber optic devices make it possible to eliminate the effects of external interference on the measuring fiber.

The use of extrinsic fiber optic devices with a Fabry-Pérot cavity facilitates the installation and maintenance of the tiltmeter in the long term. With such extrinsic fiber optic devices using a Fabry-Pérot cavity, it is no longer necessary to have a reference fiber or polarization optics. Nor does the alignment problem exist any more, it suffices to position the end of the fiber in the direction of the pot. Whereas for existing tiltmeters it is necessary to align the light source with the various mirrors. Accordingly, if an optical component fails, in existing tiltmeters it is necessary to demount the optical component, replace it and remount it, and then to realign the optical beam, all these operations being carried out at the level of the pot, in a space to which access is often difficult. With the tiltmeter of the invention it suffices to demount the optical component, replace it and remount it, without any particular alignment, all these operations being carried out in an accessible remote protected space.

The invention also relates to a measuring system including at least one of the embodiments of a tiltmeter described above and means for determining the tilt variation of the structure on the basis of the values measured by the optical measuring devices.

The fiber optic type optical measuring devices of the tiltmeter coupled to a common light source advantageously make it possible to monitor and to minimize the drift of the measuring system, to be more specific the long term drift of the measuring system, and also to reduce atmospheric, thermal, etc. noise in all frequency bands.

The invention further relates to the use of the measuring system to measure geophysical deformations.

DESCRIPTION OF THE DRAWINGS

The features and advantages of the invention will be better appreciated thanks to the following description which discloses the features of the invention through one non-limiting application example.

The description refers to the appended figures, in which:

FIGS. 6a, 6b, 6c show a comparison of the results obtained with the tiltmeter in accordance with the invention and those of the LVDT sensor long baseline tiltmeter during the earthquake in Sumatra on 11 Apr. 2012.

DETAILED DESCRIPTION OF EMBODIMENTS OF THE INVENTION

Figure 1:
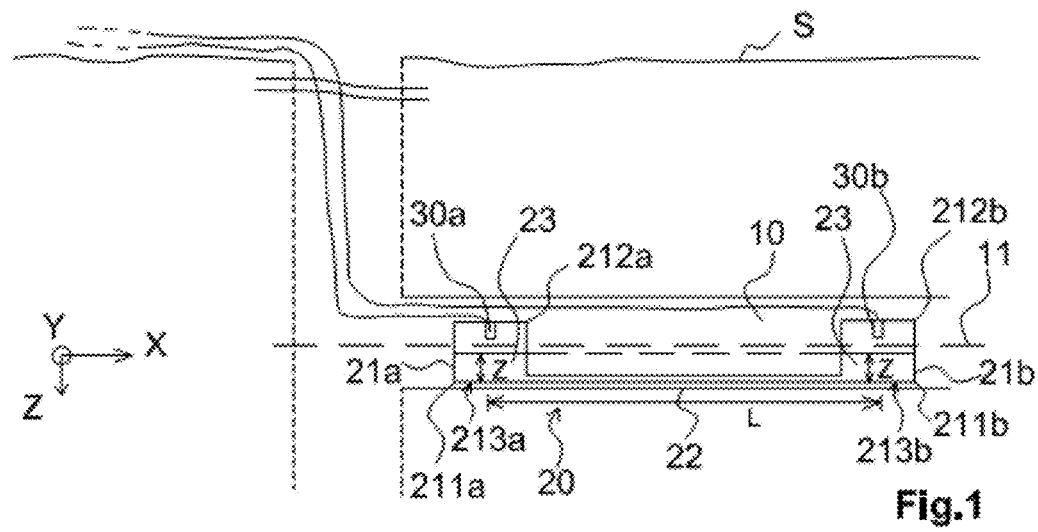
FIG. 1 shows diagrammatically the principle of one particular embodiment of the tiltmeter that is the subject matter of the invention placed in a horizontal bore for a given initial position.

One example of a measuring system in accordance with the invention for measuring the tilt variation of a structure includes a tiltmeter 20 shown diagrammatically in FIG. 1.

In the example shown, this structure is the earth's crust into which a deep bore 10 has been drilled and into which the tiltmeter 20 is introduced. The embodiment of the tiltmeter is described in detail in its application to measuring the tilt variation of the bore for seismological applications. This choice is not limiting on the invention and the invention applies equally to other applications, such as in the field of civil engineering, for example. The coupling mode is also not limiting on the invention, and these instruments can equally be installed along the walls of a tunnel or a horizontal gallery.

Throughout the description, unless otherwise indicated, at the level of the bore drilled from a ground surface S, the terms horizontal and vertical will be defined relative to terrestrial gravity. The term "vertical" therefore designates a direction substantially parallel to a terrestrial gravity acceleration vector, while the term "horizontal" designates a direction substantially perpendicular to the vertical so defined. The vertical axis is shown by the axis Z of an orthonomic spatial reference frame XYZ shown in FIG. 1. The terms "high", "low", "upper" and "lower" refer to the vertical direction Z of the system of axes XYZ. Accordingly, the terms "high" and "upper" designate a direction toward the ground surface S while the terms "low" and "lower" designate the opposite direction. The term "height" or "altitude" is defined in the vertical direction.

The bore 10 may be drilled to a depth of the order of a few meters to several hundred meters relative to the ground surface S. The greater the depth of the bore, the less the effect of mechanical noise (local deformations of the rock) coming from the surface, such as temperature, hydrological loading or atmospheric pressure, for example.

In the FIG. 1 example, the bore 10 is horizontal, that is to say has a longitudinal axis 11 having a zero tilt angle relative to the horizontal axis X. This horizontal position in which the longitudinal axis 11 has a zero tilt angle relative to the horizontal axis X defines hereinafter a given initial position of the bore.

In the FIG. 2 example, the horizontal axis 11 of the bore 10 is inclined at a non-zero tilt angle Ω relative to the horizontal axis X following a deformation of the earth's crust, referred to hereinafter as the surrounding environment.

The tiltmeter 20 in accordance with the invention is referred to as a hydrostatic or long baseline tiltmeter. The tiltmeter 20 is based on the principle of communicating vessels.

The tiltmeter 20 includes:
- a first pot 21a containing a given volume and a given height z of liquid 23,
- a second pot 21b containing the identical volume and the identical height z of the identical liquid 23,
- communication means 22 adapted to connect the two pots 21a, 21b to each other and allowing the liquid 23 to flow between the two pots when the position in terms of height (or altitude) of the two pots relative to the horizontal axis X is different.

The pots 21a, 21b are spaced apart by a distance L, varying from a few meters to several hundred meters, or even more.

The pots 21a, 21b have negligible deformation when implemented in the bore 10. Each includes at a low end 211a, 211b a lower face 213a, 213b intended to be placed in contact with a surface of the bore 10 to couple the tiltmeter 20 to said bore when said tiltmeter is introduced into said bore, as shown in FIGS. 1 and 2. The lower faces 213a, 213b of the pots 21a, 21b are firmly fixed.

The pots are made from a robust and impermeable material so as to resist the high stresses present during their installation in the bore. Moreover, to prevent oxidation, the pots are made from a non-oxidizable material.

When the bore 10 is in its initial position, the communication means 22 connecting the two pots 21a, 21b are positioned at substantially the same height (or altitude) as the low ends of the pots.

In a preferred embodiment, the communication means 22 comprise a rigid or flexible horizontal longitudinal tube connected to the two pots 21a, 21b at the level of their respective low ends 211a, 211b.

The communication means 22 are filled or semi-filled with liquid 23.

To facilitate filling and the flow of the liquid 23 between the pots, the communication means 22 are made from a non-wetting material, such as polytetrafluoroethylene (PTFE) for example.

The liquid 23 is injected in closed circuit by means of a peristaltic pump via the communication means 22.

The pots 21a, 21b are advantageously closed at a high end 212a, 212b opposite the low end 211a, 211b so as to make them airtight and impermeable to any external fluids present in the bore 10.

In a preferred embodiment, the pots 21a, 21b take the form of a hollow, for example cylindrical, container smaller than a diameter of the bore so that they can be inserted without difficulty into the bore 10.

In one embodiment, the liquid 23 used is mercury, because of its viscosity properties, its very low sensitivity to pressure effects and its very low evaporation.

In a preferred embodiment, the liquid 23 used is pure water, because it offers a very good compromise between thermal sensitivity, viscosity and cost. Moreover, pure water is a liquid that does not pollute the environment, unlike mercury.

In accordance with the principle of communicating vessels, a positive variation $\Delta z$, respectively a negative variation $-\Delta z$, in the height of the level of liquid 23 in one of the two pots 21a, 21b generates a negative variation $-\Delta z$, respectively a positive height variation $\Delta z$ of the level of liquid 23 in the other pot 21b, 21a. These level height variations are identical in absolute value. The long baseline tiltmeter 20 is therefore advantageously a differential measurement mechanical device that has the advantage, among other things, of eliminating the effects of thermal noise, expansion of the liquid, pressure effects.

It therefore appears evident, in accordance with this principle, that the variations $\Delta z$ in height of the level of liquid 23 are proportional to the distance between the pots 21a, 21b.

Moreover, increasing the distance between the two pots provides a mechanical way to improve the resolution and the stability of the measuring system.

This principle is easy to adapt to the application described here.

When the bore 10 is in its initial position, that is to say along the horizontal axis X, as shown in FIG. 1, the altitude of the pots 21a, 21b in the bore 10 is substantially identical and the height z of the level of the liquid 23 in said pots is also substantially identical between them.

A tilt of the bore 10, caused by deformations of the surrounding environment, leads to a relative modification of the altitude between the two pots 21a, 21b of the tiltmeter.

The modification of the altitude between the two pots 21a, 21b of the tiltmeter 20 consequently induces a respective modification of the height of the level of the liquid contained in each pot.

Figure 2:
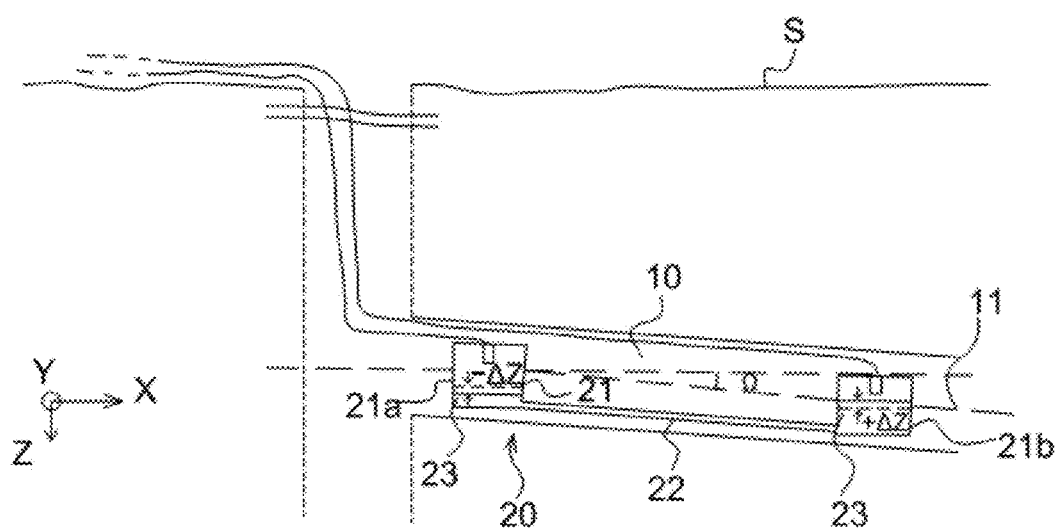
FIG. 2 shows diagrammatically the principle of one particular embodiment of the tiltmeter that is the subject matter of the invention placed in a horizontal bore for an inclined position, exaggerated here, produced following deformation of the surrounding environment.

Accordingly, if the bore 10 has a tilt angle $\Omega$ following a deformation of the surrounding environment, as shown in FIG. 2, one pot is higher in altitude than the other. The tilt variation $\Delta\Omega$ causes some of the liquid to move from the higher pot to the lower pot. This movement causes a height variation $\Delta z$ of the level of liquid in each pot. This variation is positive in one pot (the pot 21b in FIG. 2) and negative in the other pot (the pot 21a in FIG. 2). These height variations are equal and opposite. They are proportional to the tilt variation of the bore between the two pots.

The relation between the tilt variation and the liquid level height variation is expressed as follows:

$$\tan\Omega = \frac{dH}{L} = \frac{(+\Delta z - (-\Delta z))}{L} = \frac{2\Delta z}{L} \approx \Omega \qquad (1)$$

where L shows the distance between the two pots of the tiltmeter,

+$\Delta z$ shows the positive height variation of the level of the liquid in one pot, −$\Delta z$ shows the negative height variation of the level of the liquid in the other pot, H shows the height difference between the liquid levels of the two pots.

The height variations $\Delta z$ in the level of the liquid 23 being intended to measure small deformations of the surrounding environment, these variations are very small, of the order of a few nanometers to a few millimeters, relative to the characteristic length of the tiltmeter, that is to say the distance L, between 10 m and 1 km, between the two pots. The value of the tangent of the tilt angle of the surrounding environment can be approximated by the value of the tilt angle of the surrounding environment.

Consequently, the tilt variation of the surrounding environment is derived from the measurement of the liquid level height variation.

For a given tilt, the farther apart the pots, the higher the signal-to-noise ratio.

To obtain instruments with a stability of the order of $10^{-7}$ rad/year and a resolution better than $10^{-9}$ rad, the distance L between the pots is at least 30 m long.

Figure 3:
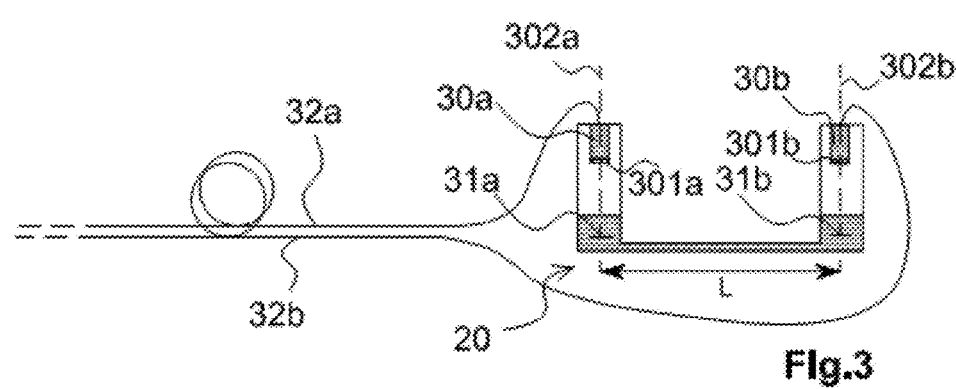
FIG. 3 is an enlarged view of the tiltmeter showing two communicating cylindrical pots and the associated optical measuring devices.

To measure these liquid level height variations $\Delta z$, equal and opposite in the two pots 21a, 21b, the tiltmeter 20 further includes, as shown in FIG. 3, two optical measuring devices 30a, 30b, one optical measuring device being associated with one pot. Each optical measuring device 30a, 30b is able and intended to measure a liquid level height variation in the associated pot. Each optical measuring device 30a, 30b forms an interferometric measuring device.

The two optical measuring devices 30a, 30b are positioned relative to their respective pot 21a, 21b so that each has an optical measuring axis 302a, 302b substantially orthogonal to the horizontally of the liquid in the pot when the tiltmeter 20 is in the initial position.

The two optical measuring devices make it possible to measure at any time the liquid level height variation Δz on the basis of the height z of the liquid level when the pots of the tiltmeter and the bore are in the initial position.

A liquid level height variation Δz caused by a deformation of the surrounding environment is very small relative to the distance L between the two pots 21a, 21b of the tiltmeter 20. The optical measuring devices 30a, 30b are therefore chosen to be able to measure very small height variations Δz, here of the order of at least $10^{-9}$ m.

The optical measuring devices 30a, 30b advantageously enable contactless measurements, in contrast for example to LVDT sensor type induced current devices, which require contact to obtain measurements.

Moreover, the optical measuring devices make it possible to increase the measurement dynamic of the tiltmeter, that is to say the maximum height variation of the level of liquid in a pot.

In the example of LVDT or capacitive sensors, the measurement dynamic is of the order of a few millimeters.

With the optical measuring devices, the measurement dynamic is at least ten times greater, at least of the order of one centimeter. It is just necessary to ensure that the end of the optical measuring device facing the liquid is beyond the maximum liquid level height variation.

Accordingly, placing the pots 21a, 21b of the tiltmeter 20 in the bore 10 necessitates less precision than existing long baseline tiltmeters. In fact, the adjustment, in the bore 10, of the position in terms of altitude of the pots of an existing long baseline tiltmeter must be to the nearest millimeter, because the measurement dynamic is of the order of one millimeter, using very precise measuring instruments, such as theodolites, for example, whereas the adjustment, in the bore 10, of the position in terms of altitude of the pots of the tiltmeter in accordance with the invention can therefore be to the nearest centimeter, because the measurement dynamic is of the order of one centimeter, and therefore with less precise measuring instruments.

In a preferred embodiment, the optical measuring devices are fiber optic devices.

Such fiber optic devices are advantageous because the fibers make it possible to site remotely the active optical components, such as an emitting light source and/or means for detection of interferometric signals, in a protected space that is not exposed to the stresses of the external environment, such as temperature, electromagnetic radiation, radiation, for example.

In one embodiment of the optical measuring device, there may be mentioned the extrinsic fiber optic measuring device described in French patent application FR 1056230 the content of which is entirely incorporated herein by reference.

Each optical measuring device 30a, 30b comprises:
 a light source (not shown in the figures), with a central wavelength $\lambda_0$, preferably a laser light source, for generating a light beam toward the associated pot,
 a reflecting surface 31a, 31b positioned inside the pot 20a, 20b,
 an optical fiber, referred to as the measuring fiber 32a, 32b, for transporting and guiding the light beam toward the associated pot, one end 301a, 301b of said measuring fiber, fixed at the level of the high end 212a, 212b of the pot 21a, 21b and positioned to face the reflecting surface 31a, 31b, forming with said reflecting surface an external Fabry-Pérot optical cavity,
 means (not shown in the figures) for detecting an interferometric signal, said interferometric signal containing information on the movement of the liquid level relative to the end of the measuring fiber, and being generated by interference between a reference light beam and a measurement light beam, said reference light beam corresponding to a fraction of the light beam from the light source that is reflected by the end of the fiber and said measurement light beam corresponding to a fraction of the light beam from the light source that is reflected by the reflecting surface and that follows an optical path in the Fabry-Pérot cavity the variation of which is a function of the height variation of the liquid level in the pot to be determined.

The height variation of the liquid level in the pot is therefore a function of an optical path variation.

The reflecting surface 31a, 31b used faces each fiber end so as to reflect to the maximum the measurement light beam.

In another embodiment, the surface 31a, 31b used to reflect the measurement light beam is a retro-reflecting surface.

In an advantageous embodiment, to eliminate small variations in wavelength between the different light sources, the two optical measuring devices have a common light source. The beam from the common light source is split by a 1*2 channel coupler into two beams, each beam propagating via a fiber toward a coupler and then toward a measuring fiber and a Fabry-Pérot optical cavity formed by the end of the measuring fiber and a reflecting surface. The set of optical measuring devices advantageously forms a differential optical measuring system which has the advantage, among other things, of eliminating the effect of drift linked to the optical portion of the tiltmeter 20, such as thermal drift, wavelength drift, drift linked to the variation of the refractive index of air, for example.

In one embodiment, the reflecting surface 31a, 31b is positioned and fixed, by means known to a person skilled in the art (not shown in the figures for the sake of clarity), in the liquid 23, of refractive index $n_2$.

In this case, for an optical measuring device, the absolute liquid level height variation in the pot is expressed as follows:

$$|\Delta z| = \frac{\Delta \theta}{2\pi} * \frac{\lambda_0}{2} * \frac{1}{|n_2 - n_1|}$$

where Δθ shows the phase difference between a reference intensity and a measurement intensity,
 $n_1$ shows the refractive index of the medium passed through between the end of the fiber and the liquid.

The medium passed through is generally air, with index $n_1=1$.

In another embodiment, in order to prevent evaporation of the liquid, the pots further contain, on top of the volume of liquid, a second, less dense volume of liquid.

In one embodiment, this second liquid is silicone oil, having a viscosity of the order of one hundred to one thousand times that of water. Silicone oil has a quasi-negligible vapor pressure enabling it to prevent any evaporation of the liquid.

In this embodiment, each reflecting surface 31a, 31b is positioned in fixed manner in the volume of second liquid, with index $n_3$, above the first liquid level, for example at the water level.

In this case, for an optical measuring device, the absolute liquid level height variation in the pot is expressed as follows:

$$|\Delta z| = \frac{\Delta \theta}{2\pi} * \frac{\lambda_0}{2} * \frac{1}{|n_3 - n_1|}$$

where $\Delta\theta$ shows the phase difference between a reference intensity and a measurement intensity, $n_1$ shows the refractive index of the medium passed through between the end of the fiber and the second liquid.

The medium passed through is generally air, with index $n_1=1$.

The system for measuring a tilt variation further includes means (not shown) for determining the tilt variation of the bore on the basis of the interferometric signals measured by the detection means of the optical measuring devices, using equation (1).

There are two pots and associated optical measuring devices, as shown in FIGS. 1 and 2. Although two pots and two associated optical measuring devices are shown in FIGS. 1 and 2, the number of these pots and optical measuring devices is not limited to that described and shown. It is therefore possible, without departing from the scope of the invention, to produce a measuring system including more than three pots communicating with one another two by two and three associated measuring devices and having the same advantages as a measuring system with two pots and associated measuring devices. A number of measuring devices greater than three advantageously makes it possible to cover large areas.

Figure 4:
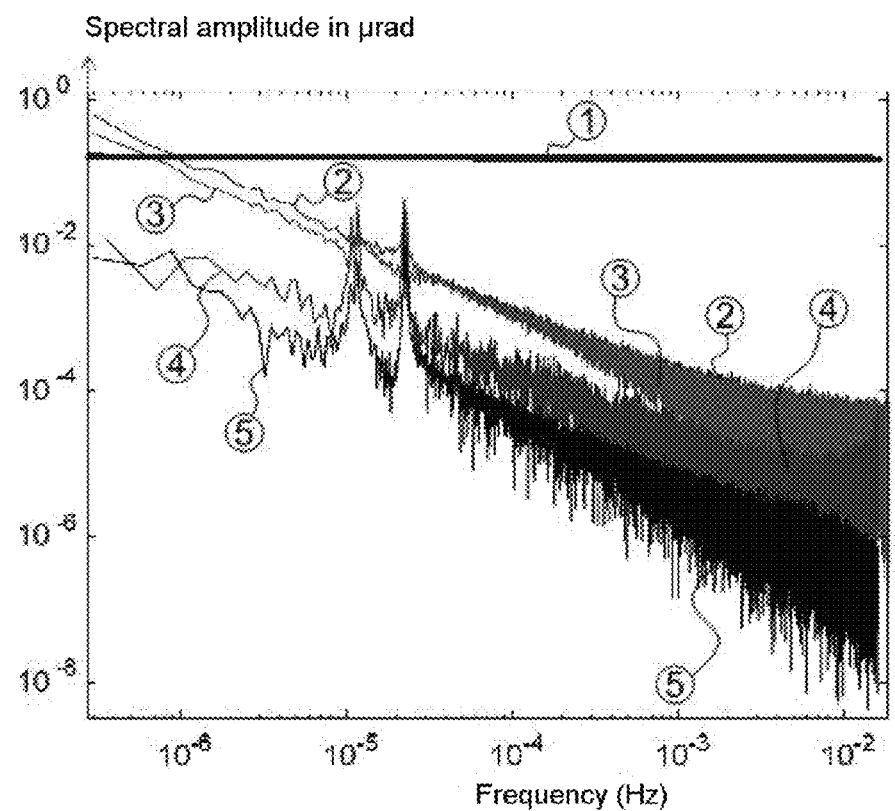
FIG. 4 shows curves comparing noise levels obtained with four measuring instruments including the interferometer in accordance with the invention.

FIG. 4 shows the comparison of the noise levels obtained with four measuring instruments under the same operating conditions over a frequency band varying from approximately $10^{-6}$ to $10^{-2}$ Hz.

Curve 1 shows the noise level obtained with a global positioning system (GPS).

Curves 2 and 3 show the noise level obtained with an Applied Geomechanics Lily® vertical bore tiltmeter for the north-south and east-west components.

Curve 4 shows the noise level obtained with a Fogale Nanotech LVDT sensor long baseline tiltmeter, referred to as a capacitive measurement long baseline tiltmeter (or instrument).

Curve 5 shows the noise level obtained with the tiltmeter in accordance with one embodiment of the invention, with fiber optic devices in common light source mode, referred to as an optical measurement long baseline tiltmeter (or instrument).

For the capacitive measurement long baseline instrument, the data was recorded at depth in a test tunnel of CERN (Conseil Européen pour la Recherche Nucléaire). The instrument includes seven measuring pots distributed uniformly and longitudinally over a total distance of 140 m.

For the optical measurement long baseline instrument, the recording was also effected in a tunnel, that of the Laboratoire Souterrain à Bas Bruit (LSBB), at Rustrel, in France. The instrument includes four measuring pots distributed uniformly and longitudinally over a total distance of 147 m.

The common laser light source is a Modulight® ML1354 DFB laser diode emitting at a central wavelength $\lambda_0$ of 1310 nm. The laser diode is fed an injection current of 30 mA and has a maximum output power of 6 mW. The optical fibers are Corning® SMF-28 type fibers. The optical fibers have a length of 270 m. The optical coupler is a China Daheng Group SMF 28 1*2 coupler. The pots are made of Pyrex®. The pots are coupled directly to the rock of the tunnel. The liquid contained in the pots is pure distilled water.

For the vertical bore tiltmeter, the recording was also effected in the LSBB tunnel. The instrument has a length of 1 m with resistive bubble measurement.

It is found that in the low frequency range, i.e. at frequencies below $10^{-6}$ Hz, the noise levels are substantially identical for the two long baseline measuring instruments (capacitive and optical).

In the frequency range between substantially $5 \cdot 10^5$ Hz and $2 \cdot 10^{-2}$ Hz, the noise level of the optical measurement long baseline tiltmeter decreases monotonously for the two long baseline instruments (capacitive and optical) but the noise level of the capacitive measurement long baseline tiltmeter, for its part, shows an increase in the noise level from $6 \cdot 10^{-3}$ Hz that continues up to $2 \cdot 10^{-2}$ Hz.

In the frequency range between substantially $5 \cdot 10^{-5}$ Hz and $6 \cdot 10^{-3}$ Hz, the optical measurement long baseline tiltmeter has ten times the resolution of the capacitive measurement long baseline tiltmeter. Beyond $6 \cdot 10^{-3}$ Hz, the optical measurement long baseline tiltmeter has one hundred times the resolution of the capacitive measurement long baseline tiltmeter.

Regardless of the frequency range, the resolution of the optical measurement long baseline tiltmeter is one hundred to one thousand times that of the GPS instrument or the vertical bore tiltmeter.

Figure 5:
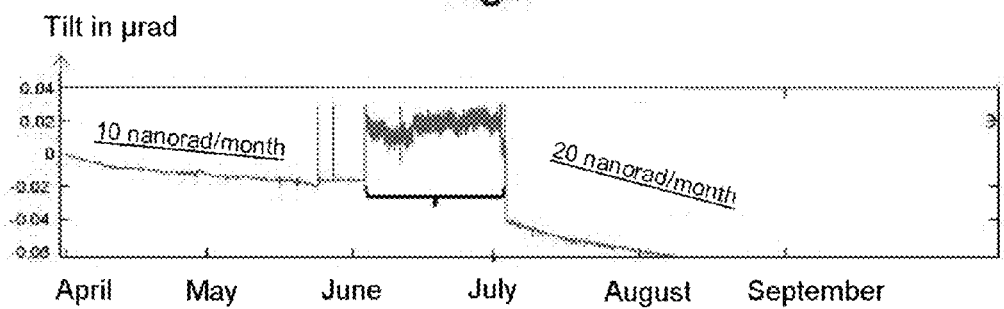
FIG. 5 shows the difference between the measurements of the tiltmeter in accordance with the invention and those of the LVDT sensor long baseline tiltmeter.

FIG. 5 shows the difference between the measurements of the optical measurement long baseline tiltmeter and the capacitive measurement long baseline tiltmeter over a period of five months under the same conditions (choice of components of each tiltmeter, distance between the pots, location, etc.) as described for obtaining the FIG. 4 results.

Over the period from April to June, a difference (given by the slope) of only 10 nrad/month is measured. This difference is caused by a drift of one of the two instruments, in this instance the capacitive measurements long baseline tiltmeter. In fact, over the period from June to early July, the capacitive measurement long baseline tiltmeter experienced malfunctions caused by problems at the level of the electrical circuit, and it is found that during this same period the measured difference is relatively flat, but noisier because linked to the increase of noise in the capacitive measurement long baseline tiltmeter. The electronic circuit of the capacitive measurement long baseline tiltmeter was replaced early in July. From then on, the slope between the measurements of the two instruments increases 20 nrad/month, in the same direction as the slope observed between April and June. This indeed proves the hypothesis to the effect that the optical measurement long baseline tiltmeter does not appear to drift over time as the two measurements are relatively constant over a period of one month, during which the capacitive measurement long baseline tiltmeter was not working.

FIGS. 6a, 6b, 6c show a comparison between the results obtained with the optical measurement long baseline tiltmeter and the capacitive measurement long baseline tiltmeter during the earthquake in Sumatra on 11 Apr. 2012, of magnitude 8.7. The measurements were made under the same conditions (choice of components of each tiltmeter, distances between the pots, location, etc.) as described for obtaining the FIGS. 4 and 5 results.

FIG. 6a shows a comparison between the measurements of the two instruments over a period of 40 hours during the earthquake. There is superposed to the same scale the measurement difference between the capacitive measurement long baseline tiltmeter and the optical measurement long baseline tiltmeter.

FIG. 6b is an enlargement of a portion of the FIG. 6a curve, before the earthquake and with the same time difference between the capacitive measurement and the optical measurement over a period of 9 hours. This FIG. 6b shows that the two measurements, capacitive and optical, are in agreement, with a maximum error of $2 \cdot 10^{-11}$ rad.

FIG. 6c shows an enlargement of a portion of the FIG. 6a curve, during the earthquake, with the same time difference between the capacitive measurement and the optical measurement over a period of 40 hours. This FIG. 6c shows that the two measurements, capacitive and optical, are in agreement, with a maximum error of 8 nrad.

Before the earthquake, a difference between the two measurements of $2 \cdot 10^{-11}$ rad is obtained, showing that the accuracy of the optical measurement long baseline tiltmeter is of the same order of magnitude as that of the capacitive measurement long baseline tiltmeter.

During the earthquake, this difference increases by substantially 3% for a total amplitude of 8 nrad, but this difference remains very small.

It can therefore be concluded that the tiltmeter in accordance with the invention has an accuracy of at least 2 to $5 \cdot 10^{-11}$ rad.

Figure 7A:
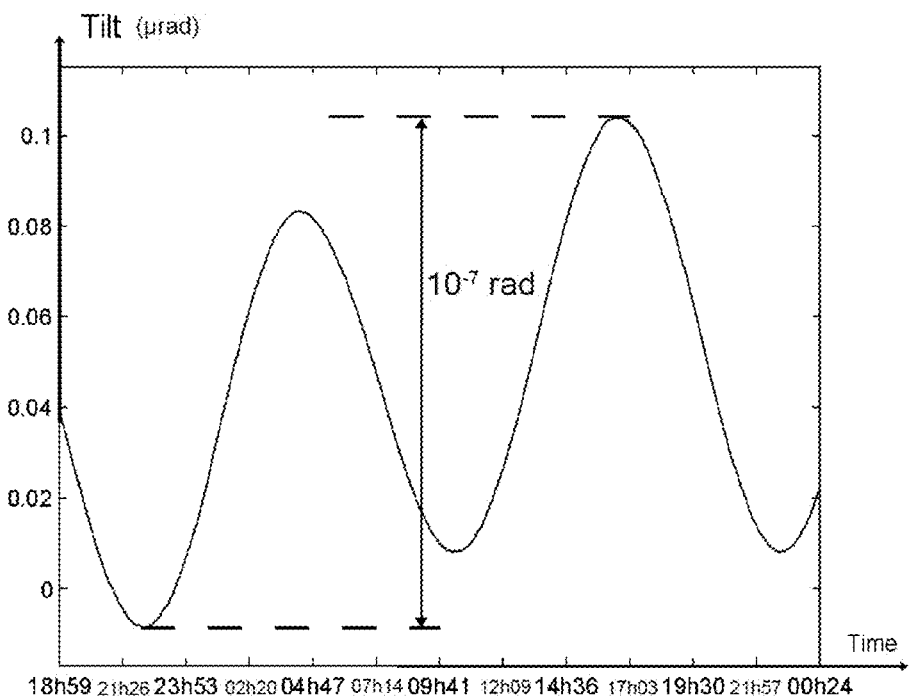
FIGS. 7a and 7b show the difference between the measurements of the tiltmeter in accordance with the invention and those of the LVDT sensor long baseline tiltmeter over a period of 36 hours.

FIG. 7a shows the curve of the measurements obtained from the tiltmeter in accordance with the invention over a period of 36 hours and corresponds to the terrestrial tide.

Figure 7B:
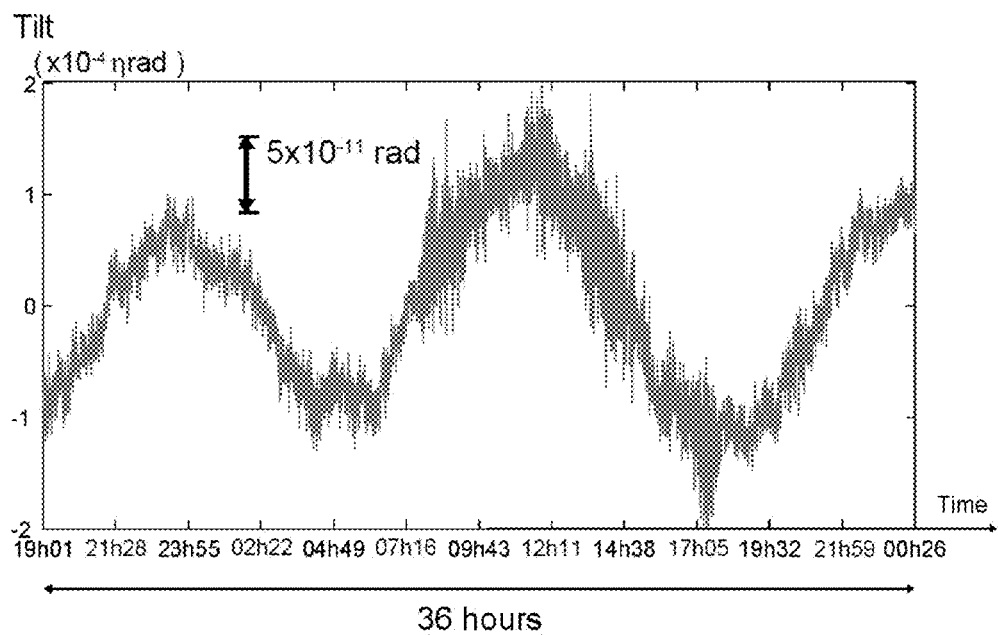

FIG. 7b shows the difference between the measurements of the tiltmeter in accordance with the invention and the LVDT sensor long baseline tiltmeter over the period of 36 hours. The difference is only $5 \cdot 10^{-11}$ rad.

FIGS. 8a to 11b show the behavior in terms of long-term drift and low sensitivity, or even zero sensitivity, to electromagnetic radiation of two embodiments of the tiltmeter 20 and the associated measuring system compared with a commercially available LVDT sensor tiltmeter.

Figure 8A:
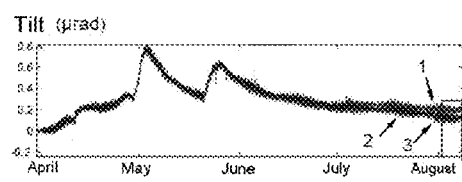
FIGS. 8a and 8b show a comparison between the results of tilt measurements obtained over several months with two embodiments of a tiltmeter of the invention and those of an LVDT sensor tiltmeter.
Figure 8B:
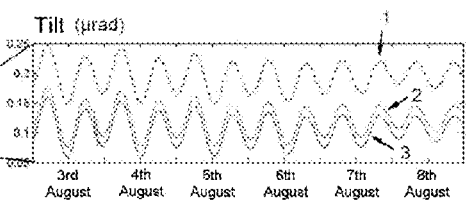

FIGS. 8a and 8b show the comparison between tilt measurements obtained over a period of several months using three different tiltmeters:
tiltmeter A: LVDT sensor long baseline tiltmeter,
tiltmeter B: tiltmeter with two extrinsic fiber optic devices, one dedicated light source per extrinsic fiber optic device,
tiltmeter C: optical measurement long baseline tiltmeter (tiltmeter with two extrinsic fiber optic devices, one light source in common light source mode).

For tiltmeter A, the data was recorded at depth in an LSBB tunnel. The tiltmeter is horizontal and includes two measurement pots 147 m apart and two LVDT sensors.

Each sensor used is a so-called "differential transformer" LVDT sensor (see Boudin et al., 2008, "A silica long base tiltmeter with high stability and resolution", Review of Scientific Instruments, vol 79 (3), 034502-1, 034502-11). It consists of a core, called the ferrite, moving in a coil consisting of a primary winding and two secondary windings disposed symmetrically relative to the primary winding. The ferrite is fixed to a silica rod. The three coils are wound concentrically around the movement axis on a silica support of mandrel type. The relative movement of the ferrite with respect to the mandrel translates the required movement. The three coils are connected to an electronic circuit board that includes an oscillator and a detector circuit.

The two LVDT sensors have their respective drifts and their respective sensitivities to external noise.

For tiltmeters B and C, the recording was also done in an LSBB tunnel. Each tiltmeter is horizontal. Each tiltmeter includes two measurement pots 147 m apart.

The common laser light source is a Modulight® ML1354 DFB laser diode emitting at a central wavelength $\lambda_0$ of 1310 nm. The laser diode is fed an injection current of 30 mA and has a maximum output power of 6 mW. The fibers are Corning® SMF-28 type fibers. The fibers have a length of at least 120 m. Such a length makes it possible to site remotely the active optical component (light sources), the detection means, etc., in a protected space, an airlock at the tunnel entrance. The pots are made of Pyrex®. The pots are coupled directly to the rock of the tunnel. The liquid contained in the pots is pure distilled water.

For tiltmeter C, the optical coupler is a China Daheng Group SMF 28 1*2 coupler.

Curve 1 shows the tilt measured by tiltmeter A, curve 2 shows the tilt measured by tiltmeter B, curve 3 shows the tilt measured by the tiltmeter C.

FIG. 8b is an enlargement of a portion of FIG. 8a.

From the three curves, it is seen that the least stable tiltmeter is tiltmeter A and the most stable tiltmeter is tiltmeter C.

Figure 9A:
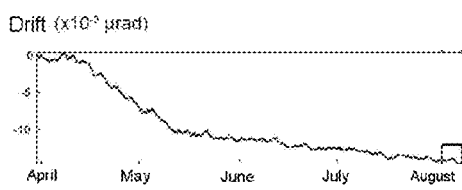
FIGS. 9a and 9b show the difference between the tilt measurements obtained with a tiltmeter in accordance with two embodiments of the invention.

The FIG. 9a curve shows the difference between the tilt measurement of tiltmeter B and that of tiltmeter C. The FIG. 9b curve is an enlargement of a portion of the FIG. 9a curve.

The measurements were carried out under the same conditions (choice of components of each tiltmeter, distances between the pots, location, etc.) as described for obtaining the FIGS. 8a and 8b results.

A measurement difference of up to 15 nrad is seen over a period of several months (4 months and a half). Such a measurement difference perfectly shows the drift of tiltmeter B relative to tiltmeter C.

Figure 10A:
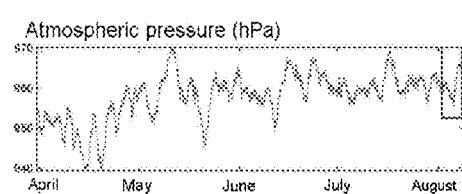
FIGS. 10a and 10b show a measurement of the atmospheric pressure around the tiltmeter in accordance with two embodiments.

The FIG. 10a curve shows the measurement of the atmospheric pressure around tiltmeters B and C by a pressure sensor during the measurements. The pressure sensor is positioned halfway between the two pots of each tiltmeter. The pressure sensor is a SETRA 278 type barometric pressure sensor. The FIG. 10b curve is an enlargement of a portion of the FIG. 10a curve. The measurements were carried out under the same conditions (choice of components of each tiltmeter, distances between the pots, location, etc.) as described for obtaining the FIGS. 8a and 8b results.

Figure 9B:
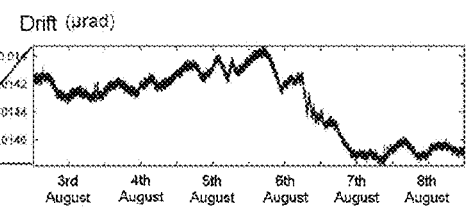
Figure 10B:
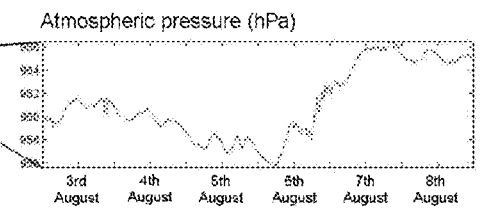

A high anti-correlation is seen between the long-term drift of tiltmeter B (FIG. 9a) and the measured atmospheric pressure (FIG. 10a). This anti-correlation is all the more marked over a shorter period (around ten days) if FIGS. 9b and 10b are compared. This shows the sensitivity of tiltmeter B to atmospheric pressure.

Figures 11A, 11B:
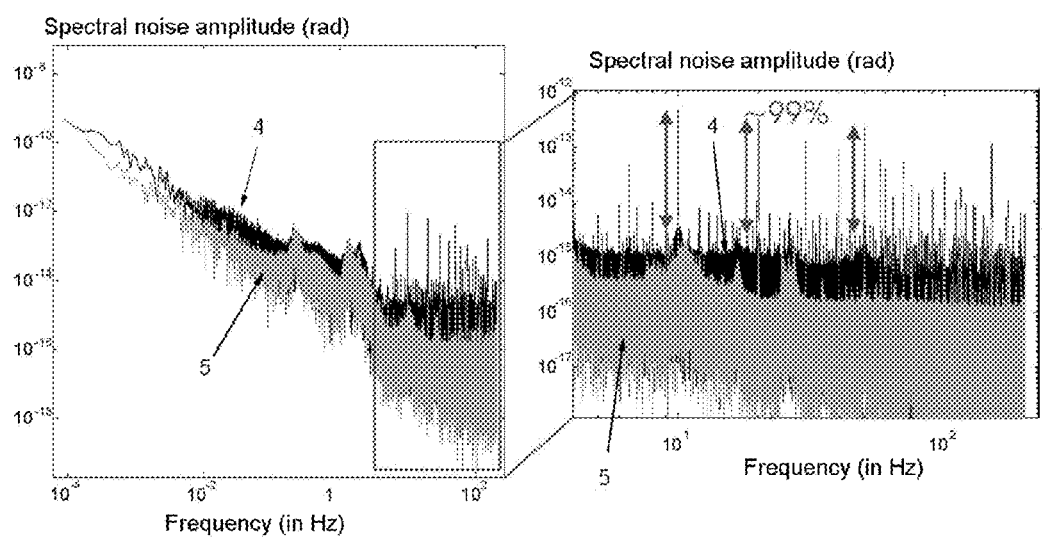
FIG. 11a and 11b show a comparison of the amplitude of the spectral noise for a tiltmeter in accordance with two embodiments of the invention.

FIG. 11a shows the comparison of the amplitude of the spectral noise between tiltmeter B and tiltmeter C over a range of frequencies between $10^{-4}$ Hz and $2 \times 10^2$ Hz. FIG. 11b as an enlargement of a portion of FIG. 11a. The measurements were carried out under the same conditions (choice of components of each tiltmeter, distances between the pots, location, etc.) as described for obtaining the FIGS. 8a and 8b results.

In FIGS. 11a and 11b, curve 4 shows the amplitude of the spectral noise of tiltmeter B, curve 5 shows the amplitude of the spectral noise of tiltmeter C.

In FIG. 11b a significant difference is seen between the amplitude of the spectral noise obtained with tiltmeter B (curve 4) and the amplitude of the noise obtained with tiltmeter C (curve 5). Where tiltmeter B is concerned, there is seen a low sensitivity to the electromagnetic field, with a spectral noise level between $10^{-13}$ and $10^{-15}$ rad for frequencies between 10 and 200 Hz, primarily because the measuring is done remotely. Where tiltmeter C is concerned, the spectral electromagnetic noise is substantially corrected by a factor of 10 to 100 (up to 99%) relative to tiltmeter B, that is to say values between $10^{-14}$ and $10^{-16}$ rad for frequencies between 10 and 200 Hz. It is therefore clear that a common light source makes it possible to reduce electromagnetic noise very significantly.

At lower frequencies, for example between $10^{-4}$ and 1 Hz, it is equally possible to measure the contribution of a common light source of tiltmeter C to the reduction of the amplitude of the spectral noise compared to tiltmeter B. The spectral electromagnetic noise is reduced by a factor of 5 to 10.

The foregoing description clearly shows that because of its various features and the advantages thereof the present invention achieves the objectives set for it. In particular, it provides a tiltmeter and a measuring system that makes it possible to eliminate the effects of both mechanical and optical drift. The tiltmeter has a small size so that it is easily transportable and easy to use, whence the possibility of use in a horizontal bore or gallery, over great distances. It is advantageously made from a heat-resistant material, so as to have a long service life. This criterion is particularly important because the measuring system is required to measure the tilt variations of a structure over a period that can spread over several years.

The materials from which it is made enable it to resist heat. Because of the compensated drift of the measuring system in accordance with the invention, the measuring system enables long-term tracking, for example over a period extending over several days, months and/or years.

The invention is described in the case of a seismological application. The invention is equally applicable to the surveillance of geological impermeable sites. In fact, some permeable geological systems covered with sealed formations enable storage of fluids such as carbon dioxide, natural gas or water, for example. In response to this storage, the geological system is slightly deformed. Measuring these deformations using tiltmeters in accordance with the invention installed in bores makes it possible to track the evolution of the storage and the migration of the fluids into the permeable layer. Because of the compensated drift of the measuring system in accordance with the invention, the measuring system enables long-term storage tracking, for example over a period extending over several days, months and/or years. The use of the measuring system in this application will be obvious to a person skilled in the art.

The invention claimed is:

1. A tiltmeter to measure a tilt variation of a structure from a given starting position, comprising:
    two sealed pots, each sealed pot comprising a closed high end and a low end, and each sealed pot containing an identical volume and an identical height of an identical first liquid, and an identical second liquid on top of the first liquid to prevent evaporation of the first liquid, the second liquid being less dense in volume than the first liquid;
    a tube configured to connect the two sealed pots at one side of their low ends and to enable the liquid to flow between the two pots in accordance with a principle of communicating vessels, the tube being distinct from the two sealed pots to constitute a separate component of the tiltmeter;
    two fiber optical interferometers, one fiber optical interferometer per sealed pot, each fiber optical interferometer measures a variation $\Delta z$ in height of a liquid level of the liquid in the associated pot, each fiber optical interferometer comprises:
        a light source, of central wavelength $\lambda_0$, to generate a light beam toward the associated pot;
        a reflecting surface positioned in a volume of the second liquid inside the associated pot;
        an optical measuring fiber to transport and guide the light beam toward the associated pot, a first end of the optical measuring fiber, fixed at a level of a high end of the associated pot and disposed facing the reflecting surface, forming with the reflecting surface an external Fabry-Pérot optical cavity;
        a detector to detect an interferometric signal generated by interference between a reference light beam and a measurement light beam, the interferometric signal comprises information on a movement of the liquid level relative to the first end of the optical measuring fiber, the reference light beam corresponds to a fraction of the light beam from the light source reflected by the first end of the optical measuring fiber, and the measurement light beam corresponds to a fraction of the light beam from the light source reflected by the reflecting surface and following an optical path in the Fabry-Pérot optical cavity, variation of the liquid level relative to the first end of the optical measuring fiber is a function of the liquid level height variation in the associated pot; and
    wherein the fiber optical interferometers are coupled to a common light source.

2. The tiltmeter as claimed in claim 1, wherein the fiber optical interferometers are extrinsic fiber optic devices and the light source is common to the two fiber optical interferometers; and the tiltmeter further comprises 1*2 channel coupler to split the light beam from the common light source into two light beams.

3. The tiltmeter as claimed in claim 2, wherein the first end of each optical measuring fiber is inside the associated pot.

4. A measuring system comprising the tiltmeter as claimed in claim 1; and further comprising a device to determine a tilt variation of the structure in accordance with values measured by the fiber optical interferometers.

5. The measuring system as claimed in claim 4 is configured to measure geophysical deformations.

6. The tiltmeter as claimed in claim 1, wherein the first liquid is water and the second liquid is silicone oil.

7. The tiltmeter as claimed in claim 1, wherein a number of the sealed pots is greater than 2 and a number of fiber optical interferometers equals the number of the sealed pots; and further comprising a plurality of tubes, each tube connecting a different pair of sealed pots.

8. The tiltmeter as claimed in claim 1, wherein said each sealed pot is made from a non-oxidizable material.

9. The tiltmeter as claimed in claim 1, wherein a distance between the two sealed pots is between 10 m to 1 km.

10. The tiltmeter as claimed in claim 1, wherein a distance between the two sealed pots is at least 30 m.

11. The tiltmeter as claimed in claim 1, wherein each pot includes at its low end, a lower face placeable in contact with a surface of a bore to couple the tiltmeter to said bore when said tiltmeter is introduced into said bore.

* * * * *